US012557063B2

(12) United States Patent
Yang et al.

(10) Patent No.: US 12,557,063 B2
(45) Date of Patent: Feb. 17, 2026

(54) METHOD AND APPARATUS FOR PROVIDING OPTIMAL COMMUNICATION BASED ON LOCATION OF USER TERMINAL (71) Applicant: KT CORPORATION, Gyeonggi-do (KR)

(72) Inventors: Sehoon Yang, Gyeonggi-do (KR); Seyoung Park, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 340 days.

(21) Appl. No.: 18/332,560

(22) Filed: Jun. 9, 2023

(65) Prior Publication Data
US 2023/0403673 A1     Dec. 14, 2023

(30) Foreign Application Priority Data
Jun. 10, 2022  (KR) ........................ 10-2022-0071068

(51) Int. Cl.
*H04W 64/00* (2009.01)
*H04B 17/345* (2015.01)
*H04B 17/391* (2015.01)
*H04W 48/20* (2009.01)
*H04W 72/0453* (2023.01)

(52) U.S. Cl.
CPC .......... *H04W 64/00* (2013.01); *H04B 17/345* (2015.01); *H04B 17/3912* (2015.01); *H04W 48/20* (2013.01); *H04W 72/0453* (2013.01)

(58) Field of Classification Search
CPC ... H04W 72/04; H04W 72/52; H04W 72/541; H04W 64/00; H04W 72/0453; H04W 48/20; H04B 17/391; H04B 17/345
See application file for complete search history.

(56) References Cited

U.S. PATENT DOCUMENTS

| 2011/0149768 | A1  | 6/2011 | Kang et al. |
| 2018/0070361 | A1* | 3/2018 | Varanese ............. H04L 25/0224 |
| 2019/0037523 | A1* | 1/2019 | Dronamraju .......... H04W 80/12 |
| 2023/0015159 | A1* | 1/2023 | Ko ......................... H04J 11/005 |

FOREIGN PATENT DOCUMENTS

| JP | 6515416 B2 | 5/2019 |
| KR | 10-1688963 B1 | 12/2016 |
| KR | 10-2019-0055470 A | 5/2019 |
| KR | 10-1959869 B1 | 7/2019 |

* cited by examiner

*Primary Examiner* — Iqbal Zaidi
(74) *Attorney, Agent, or Firm* — IP Legal Services, LLC (57) ABSTRACT A method for providing optimal communication performed by a computing system includes constructing a radio map including information for calculating an interference component for each channel, for one or more access points (APs), estimating a location of a user terminal, based on the radio map, and determining at least one of an optimal AP and an optimal channel for the estimated location of the user terminal, based on the interference component for each channel.

18 Claims, 7 Drawing Sheets

METHOD AND APPARATUS FOR PROVIDING OPTIMAL COMMUNICATION BASED ON LOCATION OF USER TERMINAL

CROSS-REFERENCE TO RELATED APPLICATION

This application claims priority to and the benefit of Korean Patent Application No. 10-2022-0071068 filed in the Korean Intellectual Property Office on Jun. 10, 2022, the entire contents of which are incorporated herein by reference.

BACKGROUND

(a) Field

The present disclosure relates to a method and apparatus for providing optimal communication based on a location of a terminal, and more particularly, to a technology for providing an optimal Wi-Fi AP and channel according to a location of a user terminal based on a radio map.

(b) Description of the Related Art

Recently, with the activation of smart terminals and media services, data usage has continuously increased. The use of Wi-Fi-based wireless communication indoors has increased thanks to the widespread of Wi-Fi technology. However, in certain environment such as apartments, studios, etc., where a Wi-Fi access point (AP) is not installed in a built-up type, such as an office, individual households often set up their own Wi-Fi APs. This environment makes it challenging to achieve integrated optimization, leading to potential performance degradation due to interference between Wi-Fi channels.

In order to minimize such a problem, one approach to minimize the problem is to optimize the default channel, which is usually set for each band (2.4 or 5 GHz) when the AP is initially installed, through user setting or automated processed. From the user's perspective, the optimization may appear to improve the uplink signal. However, services mainly used by users, such as video streaming, gaming, and file transmission, may often generate downlink traffic. As a result, the channel selected in the AP setting stage may not be considered as an optimal channel for these types of activities.

Accordingly, there is a need in the field for a technology that can improve user satisfaction with communication quality by dynamically determining and providing optimal Wi-Fi communication according to a location of a user terminal.

SUMMARY

The present disclosure may provide optimized communication for a location of each terminal by dynamically determining an optimal Wi-Fi access point (AP) and an optimal channel according to a location of a user terminal through a pre-constructed radio map. In addition to the above tasks, the present disclosure may be used to achieve other tasks not specifically mentioned.

According to some exemplary embodiments, a method for providing optimal communication performed by a computing system may include: constructing a radio map including information for calculating an interference component for each channel, for one or more access points (APs); estimating a location of a user terminal, based on the radio map; and determining at least one of an optimal AP and an optimal channel for the estimated location of the user terminal, based on the interference component for each channel.

The information for calculating the interference component for each channel may include at least some of channel information and bandwidth information provided by each of the one or more APs.

The radio map further may include at least some of AP identification information of each of the one or more APs and reception sensitivity information for a location of each of the one or more APs, and the estimating the location of the user terminal may include: comparing terminal reception sensitivity collected from the user terminal with the reception sensitivity information of the radio map for each location; and estimating, as a location of the user terminal, a location corresponding to the reception sensitivity information for each location having a highest similarity with the terminal reception sensitivity.

The determining at least one of the optimal AP and optimal channel may include: determining, as the optimal AP, an AP having a highest reception sensitivity at the location of the user terminal, among the one or more APs; and determining as the optimal channel, a channel having a highest SINR value calculated based on the interference component for each channel of remaining APs, except for the optimal AP, among channels of the optimal AP.

The determining at least one of the optimal AP and optimal channel may include: classifying the one or more APs, based on whether the one or more APs are capable of changing channels; identifying $AP_{MAX,D}$ having a highest reception sensitivity at the location of the user terminal, among $AP_{DS}$ capable of changing channels; determining whether $AP_{MAX,F}$ having a greater reception sensitivity, compared to the $AP_{MAX,D}$, among the $AP_F$ incapable of changing channels; when the $AP_{MAX,F}$ does not exist, determining the $AP_{MAX,D}$ as the optimal AP; and determining, as the optimal channel, a channel having a highest SINR value calculated based on the interference component for each channel of remaining APs, except for the optimal AP, among the channels of the optimal AP.

The determining at least one of the optimal AP and the optimal channel may include: when the $AP_{MAX,F}$ exists, calculating a $SINR_F$ value of a channel of the $AP_{MAX,F}$, based on the interference component for each channel of the remaining APs, except for the $AP_{MAX,F}$, identifying a highest $SINR_D$ value, among the SINR values of respective channels provided by the $AP_{MAX,D}$, based on the interference component for each channel of the remaining APs, except for the $AP_{MAX,D}$; and when the $SINR_F$ value is higher than the $SINR_D$ value, determining $AP_{MAX,F}$ as the optimal AP and determining a channel of the $AP_{MAX,F}$ as the optimal channel.

The determining at least one of the optimal AP and optimal channel further may include: when the $SINR_D$ value is higher than the $SINR_F$ value, determining the $AP_{MAX,D}$ as the optimal AP; and determining a channel corresponding to the $SINR_D$ value, among the channels of the $AP_{MAX,D}$, as the optimal channel.

The determining the optimal channel may include: calculating a SINR value for each channel of the optimal AP by considering only the interference component for each channel of an $AP_F$ incapable of changing channels, among remaining APs except for the optimal AP; and determining, as the optimal channel, a channel for which a highest SINR value is calculated.

The method may further include, if there is at least one non-optimal AP being using the optimal channel, changing the channel of the at least one non-optimal AP to a different channel than the optimal channel.

According to some exemplary embodiments, a method for providing optimal communication performed by a computing system may include: constructing a radio map including information for calculating an interference component for each channel, for a plurality of access points (APs); identifying an $AP_{MAX}$ having a highest reception sensitivity at a current location of a user terminal, among the plurality of APs, based on the radio map; and determining at least one of an optimal AP and an optimal channel for the current location of the user terminal, based on an attribute of the $AP_{MAX}$ and an interference component for each channel of at least some of the plurality of APs.

The information for calculating the interference component for each channel may include at least some of channel information and bandwidth information provided by each of the plurality of APs.

The radio map may further include at least some of AP identification information of each of the one or more APs and reception sensitivity information for a location of each of the one or more APs The current location of the user terminal may be a location corresponding to reception sensitivity information for each location having a highest similarity with a terminal reception sensitivity collected by the user terminal, by comparing the terminal reception sensitivity with reception sensitivity information for each location of the radio map.

The determining at least one of the optimal AP and optimal channel may include: determining the $AP_{MAX}$ as the optimal AP; and determining as the optimal channel, a channel having a highest SINR value calculated based on the interference component for each channel of remaining APs, except for the optimal AP, among channels of the optimal AP.

The attribute of the AP may include whether the AP is capable of changing channels.

The determining at least one of the optimal AP and optimal channel may include: classifying the plurality of APs, based on whether the one or more APs are capable of changing channels; when the $AP_{MAX}$ is an $AP_D$ capable of changing channels, determining the $AP_{MAX}$ as the optimal AP; and determining, as the optimal channel, a channel having a highest SINR value calculated based on the interference component for each channel of remaining APs, except for the optimal AP, among the channels of the optimal AP.

The determining at least one of the optimal AP and the optimal channel may include: when the $AP_{MAX}$ is an $AP_F$ incapable of changing channels, calculating a SINR value of a channel of the $AP_{MAX}$, based on the interference component for each channel of the remaining APs, except for the $AP_{MAX}$, identifying a highest $SINR_D$ value, among the SINR values of respective channels of $AP_{MAX,D}$, among the $AP_{DS}$ capable of changing channels; and when the $SINR_F$ value is higher than the $SINR_D$ value, determining the $AP_{MAX}$ as the optimal AP and determining a channel provided by the $AP_{MAX}$ as the optimal channel.

The determining at least one of the optimal AP and optimal channel may further include: when the $SINR_D$ value is higher than the $SINR_F$ value, determining the $AP_{MAX,D}$ as the optimal AP; and determining a channel corresponding to the $SINR_D$ value, among the channels of the $AP_{MAX,D}$, as the optimal channel.

The determining of the optimal channel may include: calculating a SINR value for each channel of the optimal AP by considering only the interference component for each channel of an $AP_F$ incapable of changing channels, among remaining APs except for the optimal AP; and determining, as the optimal channel, a channel for which a highest SINR value is calculated.

The method may further include, if there is at least one non-optimal AP being using the optimal channel, changing the channel of the at least one non-optimal AP to a different channel than the optimal channel.

According to some exemplary embodiments, a computing apparatus may include: a memory comprising instructions; and a processor executing the instructions to: construct a radio map including information for calculating an interference component for each channel, for one or more access points (APs); estimate a location of a user terminal, based on the radio map; and determine at least one of an optimal AP and an optimal channel for the estimated location of the user terminal, based on the interference component for each channel.

According to some exemplary embodiments of the present disclosure, quality of service (QoS) may be improved by providing a communication service through an optimal channel selected based on a location of a terminal.

According to some exemplary embodiments of the present disclosure, it is possible to expand scalability and applicability compared to costs for construction of a radio map database (DB) by suggesting an additional utilization method of the radio map DB for providing a location-based service.

According to some exemplary embodiments of the present disclosure, it is possible to preemptively respond to customer complaints through monitoring of wire quality, as well as wireless Wi-Fi quality.

DETAILED DESCRIPTION OF THE EXEMPLARY EMBODIMENTS

Hereinafter, exemplary embodiments will be described in detail with reference to the accompanying drawings such that they may be easily practiced by those skilled in the art to which the present disclosure pertains. As those skilled in the art would realize, the described exemplary embodiments may be modified in various different ways, all without departing from the spirit or scope of the present disclosure. In the accompanying drawings, a portion irrelevant to description of the present disclosure will be omitted for clarity, and like reference numerals refer to like elements throughout.

It will be further understood that the term "include" is used to specify that any one component includes the other component, this does not preclude the presence or addition of one or more other components unless otherwise stated. Devices constituting a network may be implemented as hardware, software, or a combination of hardware and software.

Figure 1:
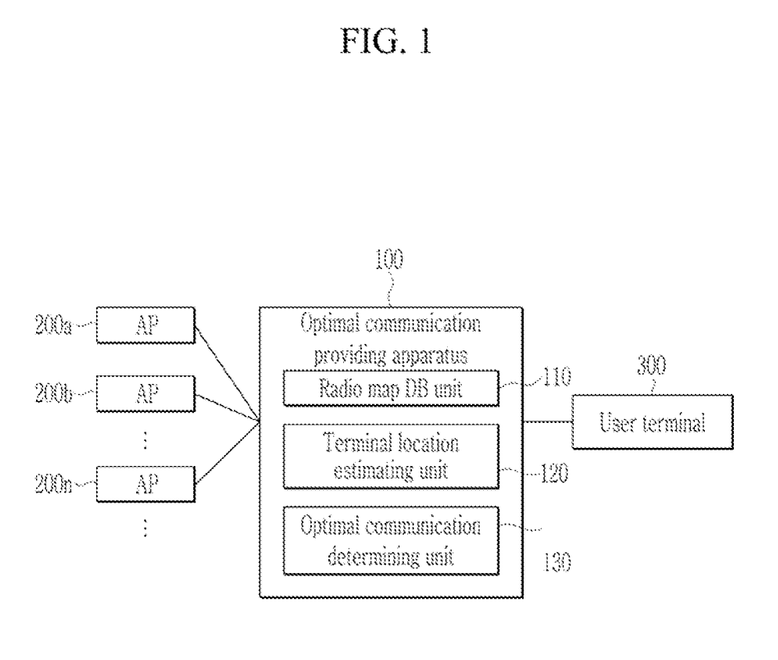
FIG. 1 is a block diagram illustrating an optimal communication providing apparatus according to some exemplary embodiments of the present disclosure.

FIG. 1 is a block diagram illustrating an optimal communication providing apparatus according to some exemplary embodiments of the present disclosure.

Referring to FIG. 1, an optimal communication providing apparatus 100 according to the present disclosure may include a radio map database (DB) unit 110, a terminal location estimating unit 120, and an optimal communication determining unit 130. However, the components described above are not essential to implement the optimal communication providing apparatus 100 according to the present disclosure, and the optimal communication providing apparatus 100 may have more or fewer components than the above-listed components.

Meanwhile, the optimal communication providing apparatus 100 may be communicatively connected to a plurality of access points (APs) 200a, 200b, . . . , 200n and at least one user terminal 300. In FIG. 1, for convenience of description, the optimal communication providing apparatus 100 is shown to be distinguished from the user terminal 300, but the present disclosure is not limited to that configuration, and the optimal communication providing apparatus 100 may be implemented as a single device with the user terminal 300.

The radio map DB unit 110 may collect information on one or more APs 200 and construct a radio map DB.

The radio map DB may include a propagation pattern formed by the AP 200 in a specific area. In order to construct the radio map DB, the radio map DB unit 110 may collect and store information on the AP 200 in units of locations of one or more grids constituting the specific area. The information on the AP 200 collected here may include at least some of AP identification information, such as SSID and/or BSSID, reception sensitivity information for each location, channel information for each AP, and bandwidth information. Received sensitivity may be measured by a received signal strength indicator (RSSI).

Since a conventional radio map is constructed for the purpose of positioning, information on the center frequency and bandwidth of each AP is not collected. In contrast, the optimal communication providing apparatus 100 may collect channel information and bandwidth information provided for each AP in units of grid locations, thereby utilizing the radio map not only for optimal communication, but also for location estimation, which is a well-known application of the radio map.

In the case of Wi-Fi, a center frequency may be calculated based on channel information, and up to which center frequency interference extends may be determined based on the bandwidth information. Accordingly, the radio map DB unit 110 may estimate the user's location by constructing a radio map including channel information and bandwidth information for each AP for calculating an interference component for each channel, and provide optimal communication dynamically determined for an estimated location to the user terminal 300. Meanwhile, information on the AP 200 used in the process of estimating the user's location may include AP identification information and reception sensitivity information for each location, and the channel information for each AP may not be used in the location estimation process. In general, in the case of radio map-based positioning, similarity is determined based on RSSI and AP identification information regardless of channel, so changing a channel of an AP capable of arbitrarily changing channels does not affect location estimation. However, if necessary, location estimation may be performed, excluding the corresponding AP, to check a change in performance and update the radio map DB unit 110.

The terminal location estimating unit 120 may estimate the user's location by comparing the terminal reception sensitivity collected by the user terminal 300 with a radio map previously constructed by the radio map DB 110.

Specifically, the terminal location estimating unit 120 may compare the reception sensitivity collected by the user terminal 300 with reception sensitivity information of a signal for each location of each AP stored in the radio map DB in units of grid locations, and estimate a grid location corresponding to reception sensitivity information for each location having highest similarity as a current location of the user terminal 300.

The optimal communication determining unit 130 may determine at least one of an AP and a channel capable of providing optimal communication with respect to the current location of the user terminal 300 estimated by the terminal location estimating unit 120.

Here, the AP capable of providing optimal communication (hereinafter referred to as an "optimal AP") may refer to an AP capable of securing optimal communication quality at the estimated current location of the user terminal 300, among APs to which the user terminal 300 may access, and may specifically be an AP that provides a channel (hereinafter referred to as an "optimal channel") capable of securing an optimal signal-to-interference noise ratio (SINR).

Here, the accessible AP may refer to an AP that the user terminal 300 may access when necessary to use the Internet service, such as an AP that the user knows a password or the user terminal 300 has a history of access, a public AP, and the like.

The optimal communication determining unit 130 may determine at least one of the AP and channel capable of providing optimal communication at the estimated current location of the user terminal 300, based on the reception sensitivity information for each location of each AP collected by the radio map DB unit 110.

Specifically, the optimal communication determining unit 130 may determine an AP having the highest reception sensitivity at the location of the user terminal 300 among accessible APs, as an optimal AP. And, for the remaining APs excluding the optimal AP, among the channels of the optimal AP, the optimal communication determining unit 130 may add up reception sensitivity at the current location of the user terminal 300 for each channel using the radio map DB unit 110 to calculate an interference component for each channel.

Here, a reception sensitivity level for each AP is generally collected in a dBm unit corresponding to a logarithmic scale. The optimal communication determining unit 130 may convert the reception sensitivity level for each AP into an mW unit corresponding to a linear scale, add up the converted reception sensitivity level of each AP by channels to calculate an interference component for each channel, and then convert the interference component into the dBm unit.

Based on the interference component calculated in this manner, the optimal communication determining unit 130 may determine a channel having the smallest interference component, that is, a channel capable of securing the largest SINR value as an optimal channel. Regarding a specific method of determining the optimal channel and/or the optimal AP, exemplary embodiments in which the number of APs and whether the APs are capable of changing channels are different from each other will be described in detail.

In an exemplary embodiment, there may be one accessible AP. In this case, the optimal communication determining unit 130 may calculate an interference component for each channel at the estimated current location of the user terminal 300 for each of one or more channels provided by an accessible AP, based on the radio map DB. Also, the optimal communication determining unit 130 may determine, as an optimal channel, a channel capable of securing an optimal SINR value with the smallest calculated interference component.

Meanwhile, when the current channel of the accessible AP is not the determined optimal channel, the optimal communication providing apparatus 100 may change the channel of the accessible AP to the optimal channel, and provides a communication connection to the user terminal 300 through the changed optimal channel.

In another exemplary embodiment, there may be two or more accessible APs. In this case, the optimal communication determining unit 130 may first classify whether a channel of each of the plurality of accessible APs is changeable, and then identify an AP (hereinafter "$AP_{MAX}$") having the largest reception sensitivity at the estimated current location of the user terminal 300, among the plurality of accessible APs.

If the identified $AP_{MAX}$ is an AP with the ability to change channels dynamically (hereinafter referred to as "$AP_D$"), the optimal communication determining unit 130 may determine the corresponding AP (i.e., $AP_{MAX,D}$) as the optimal AP, and determine an optimal channel by the same process as described in the above example where one accessible AP is involved. That is, the optimal communication determining unit 130 may calculate an interference component for each channel at the estimated current location of the user terminal 300 for each of one or more channels provided by $AP_{MAX,D}$, and determine a channel with the smallest calculated interference component. as an optimal channel.

In this case, the interference component caused by the $AP_D$ capable of changing channels may be controlled by changing channels, but an interference component caused by $AP_F$ incapable of changing channels cannot be controlled. Therefore, when calculating a maximum SINR secured by $AP_{MAX,D}$, the maximum SINR is calculated by excluding the interference component caused by $AP_D$ and including the interference component caused by $AP_F$.

Moreover, if the current channel of $AP_{MAX,D}$ is not an optimal channel, the optimal communication determining unit 130 may change the channel of $AP_{MAX,D}$ into an optimal channel and provide a communication connection to the user terminal 300 through the newly selected optimal channel. Furthermore, if at least one of the remaining APs other than $AP_{MAX,D}$ uses the determined optimal channel and the corresponding AP being using the optimal channel is $AP_D$ capable of changing channels, the optimal communication determining unit 130 may change the channel of the corresponding $AP_D$ to a channel different from the optimal channel to thereby improve communication quality provided to the user terminal 300 by $AP_{MAX,D}$.

Table 1 shows an example that $AP_{MAX}$, which has the largest reception sensitivity level at the estimated current location of the user terminal 300, among a plurality of accessible APs, is $AP_{MAX,D}$ capable of arbitrarily changing channels.

TABLE 1

| Channel | Reception sensitivity for each AP | | | | | Interference component (mW) | Interference component (dBm) |
|---|---|---|---|---|---|---|---|
| | AP | AP | $AP_D$ | $AP_D$ | $AP_F$ | | |
| 1 | −84 | −88 | −90 | −85 | −82 | 1.6E−08 | −77.95 |
| 2 | −92 | | −75 | −85 | −54 | 4E−06 | −53.96 |
| 3 | −76 | | −82 | | −90 | 3.2E−08 | −74.89 |
| 4 | −93 | −94 | −72 | (a) −53 | −94 | 6.4E−08 | −71.91 |
| 5 | −81 | −91 | (c) −76 | −88 | (d) −60 | 1E−06 | −59.96 |
| 6 | −79 | −92 | −95 | −88 | −92 | 1.6E−08 | −78.03 |
| 7 | | −81 | −76 | | −77 | 5.3E−08 | −72.76 |
| 8 | −91 | −81 | −86 | (b) | −93 | 1.2E−08 | −79.3 |

In Table 1, since the reception sensitivity value indicated by (a) is the largest, $AP_{MAX,D}$ corresponding to the reception sensitivity value may be determined as the optimal AP. Referring to the calculated interference component, it is observed that channel 8 has the smallest interference component. Therefore, when the optimal AP (here, $AP_{MAX,D}$) is currently operating on channel 4, it can be beneficial to change the channel of the optimal AP to channel 8 and provided it to the user terminal 300, referring to (b) of Table 1. In this case, it is anticipated that a SINR of be 26.3 dB can be achieved.

Additionally, the maximum SINR achievable by $AP_{MAX,D}$ may be calculated by excluding the interference component caused by $AP_D$ and including the interference component caused by $AP_F$. Considering channel 5 as an example, an interference component for each channel may be calculated by excluding −76 dBm which is an interference component caused by the $AP_D$, referring to (c) of Table 1, and including −60 dBm which is an interference component caused by $AP_F$, referring to (d) of Table 1.

When the identified $AP_{MAX}$ is an $AP_F$ that cannot arbitrarily change channels, the optimal communication determining unit 130 may calculate an interference component of the remaining AP for a channel provided by the $AP_{MAX,F}$, and determine whether the maximum SINR that can be secured in the channel provided by the $AP_{MAX,F}$ is greater than the maximum SINR that can be secured by the $AP_{MAX,D}$ having the largest reception sensitivity level among $AP_{DS}$.

In this case, the interference component caused by the $AP_D$ capable of changing channels may be controlled by changing channels, but the interference component caused by the $AP_F$ incapable of changing channels cannot be controlled, and thus, the maximum SINR that can be secured by $AP_{MAX,F}$ may be calculated by excluding the interference component caused by $AP_D$ and the maximum SINR that can be secured by $AP_{MAX,D}$ may be calculated by including the interference component by $AP_F$.

When the maximum SINR that may be secured is calculated by $AP_{MAX,F}$, the optimal communication determining unit 130 may determine the corresponding $AP_{MAX,F}$ as an optimal AP and determine a channel provided by the corresponding $AP_{MAX,F}$ as an optimal channel. In this case, when at least one AP among the remaining APs uses the optimal channel and the corresponding AP being using the optimal channel is $AP_D$ capable of changing channels, the optimal communication determining unit 130 may change the channel of the corresponding $AP_D$ to a channel different form the optimal channel, thereby improving communication quality provided to the user terminal 300 by $AP_{MAX,F}$.

Table 2 shows an example that $AP_{MAX}$, which has the largest reception sensitivity level at the estimated current location of the user terminal 300, among a plurality of accessible APs, is $AP_{MAX,F}$ incapable of changing channels:

TABLE 2

| Channel | Reception sensitivity level for each AP | | | | | Interference component (mW) | Interference component (dBm) |
|---|---|---|---|---|---|---|---|
| | AP | AP | $AP_D$ | $AP_D$ | $AP_F$ | | |
| 1 | −84 | −88 | −90 | −85 | −82 | 1.6E−08 | −77.95 |
| 2 | −92 | | −75 | −85 | (a) −54 | 3.5E−08 | −74.51 |
| 3 | −76 | | −82 | | −90 | 3.2E−08 | −74.89 |
| 4 | −93 | −94 | −72 | (c) −58 | −94 | 6.4E−08 | −71.91 |
| 5 | −81 | −91 | (d) −76 | −88 | (b) −57 | 1E−08 | −79.86 |
| 6 | −79 | −92 | −95 | −88 | −92 | 1.6E−08 | −78.03 |
| 7 | | −81 | −76 | | −77 | 5.3E−08 | −72.76 |
| 8 | −91 | −81 | −86 | | −93 | 1.2E−08 | −79.3 |

In Table 2, in the case of $AP_F$ indicated by (a), the maximum achievable SINR in channel 2 may be calculated as 20.51 dBm, and in the case of $AP_F$ indicated by (b), the maximum achievable SINR in channel 5 may be calculated as 22.86 dBm. Accordingly, $AP_F$ indicated by (b) may be identified as $AP_{MAX,F}$. Meanwhile, when calculating the interference component for $AP_{MAX,D}$ indicated by (c), the interference component caused by $AP_F$ should be included, and thus, the maximum SINR that may be secured by $AP_{MAX,D}$ may be calculated as 21.3 dBm in channel 8.

That is, since the maximum achievable SINR, which is 22.86 dBm, is calculated from $AP_{MAX,F}$, $AP_{MAX,F}$ may be determined as an optimal AP, and channel 5 provided by $AP_{MAX,F}$ may be determined as an optimal channel and provided to the user terminal 300. Furthermore, a channel of the $AP_D$, referring to (d) of Table 2, using channel 5 may be changed to an arbitrary channel other than channel 5 so that the interference component for $AP_{MAX,F}$ may be controlled to be lowered.

Meanwhile, among a plurality of accessible APs, there may not be $AP_D$ capable of changing channels, and in this case, the optimal communication determining unit 130 may determine an $AP_F$ having the largest reception sensitivity level at the estimated current location of the user terminal 300 as an optimal AP and determine a channel provided by the corresponding $AP_{MAX,F}$ as an optimal channel.

Figure 2A:
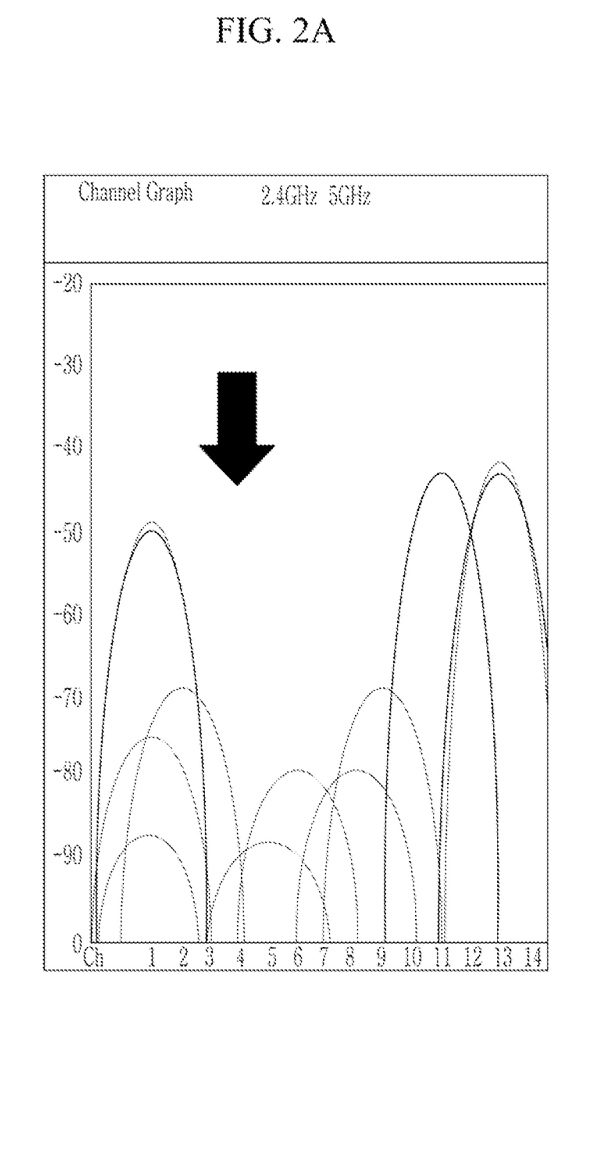
FIGS. 2A to 2C are diagrams illustrating an example of the related art compared to an optimal communication providing method of the present disclosure.
Figure 2B:
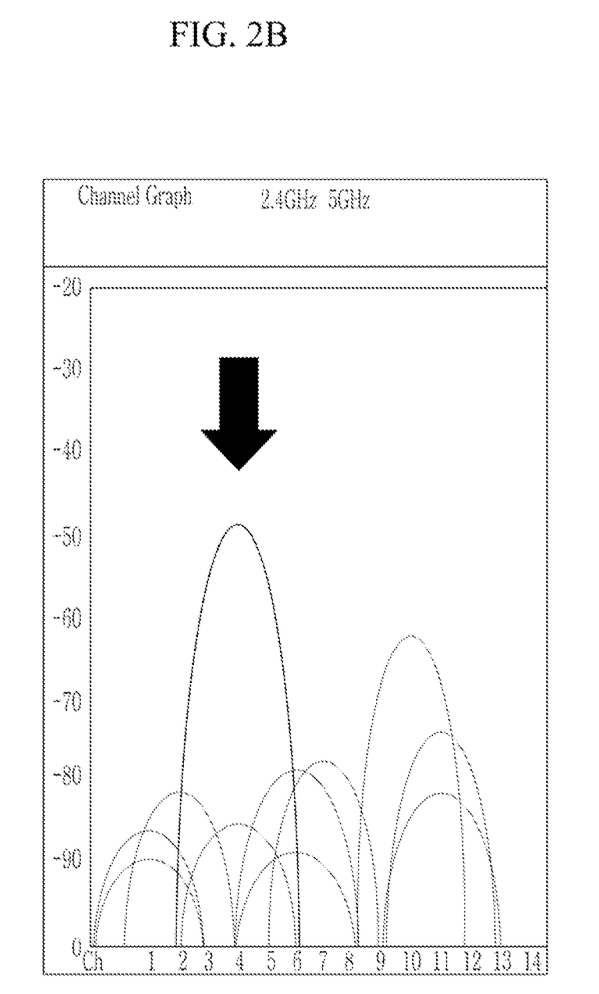
Figure 2C:
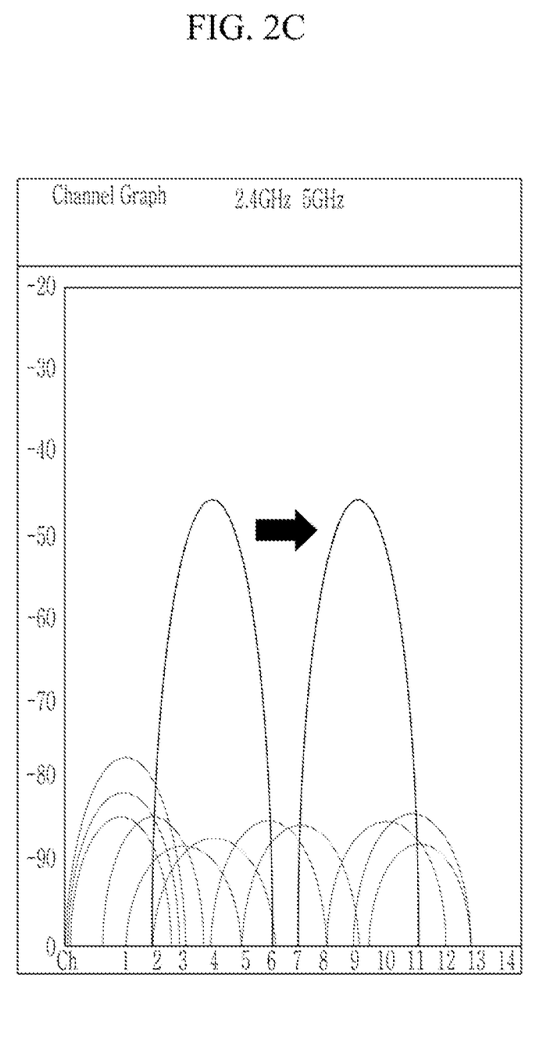

FIGS. 2A to 2C are diagrams illustrating an example of the related art compared to an optimal communication providing method of the present disclosure.

FIG. 2A shows an example of channel scanning in an initial AP setting operation and the configured optimal channel indicated by an arrow. FIG. 2B shows an example of scanned signal sensitivity for each channel actually received by the actual user terminal 300, according to the previous optimization approach. This shows a lack of correspondence between the optimal channel configured during the initial setting and the actual optimal channel at user terminal. FIG. 2C shows an example of providing an optimal channel according to the present disclosure to solve such a problem.

According to the related art, during the initial AP setting operation, a scanning process is generally performed to identify an optimal channel for each frequency band. This scanning process aims to select a channel with minimal interference, as in a channel indicated by the arrow of FIG. 2A, to an optimal channel in the corresponding AP to provide a communication service.

However, since the optimal channel is selected based on the AP, it may be difficult to regard it as an optimal channel from the point of view of the user terminal 300. For example, as shown in FIG. 2B, the user terminal 300 acquires a signal distribution for each channel different from that identified during the AP scanning. In addition, when the location of the user terminal 300 moves, the signal distribution for each channel continuously changes depending on the location.

Therefore, in the optimal communication providing method according to the present disclosure, a pre-established radio map DB is utilized to identify a channel with lower interference compared to a pre-set channel of an AP, according to a location change of the user terminal 300, as represented in FIG. 2C. That is, the optimal communication providing method according to the present disclosure may enable dynamic determination and adjustment of the optimal AP and the optimal channel, according to the location change of the user terminal 300. Ultimately, the present disclosure facilitates communication optimization based on the specific location of the user terminal 300.

Figure 3:
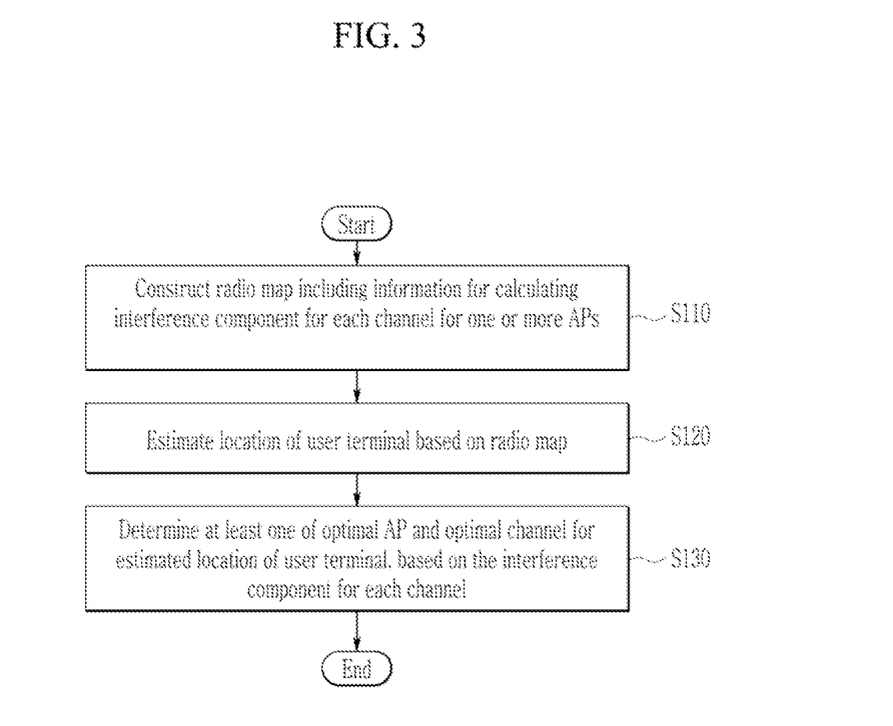
FIG. 3 is a flowchart illustrating an optimal communication providing method according to some exemplary embodiments of the present disclosure.

FIG. 3 is a flowchart illustrating an optimal communication providing method according to some exemplary embodiments of the present disclosure.

Referring to FIG. 3, the optimal communication providing apparatus 100 may construct a radio map including information for calculating an interference component for each channel for one or more APs (S110).

The radio map DB may include a propagation pattern formed by the AP 200 in a specific area. In order to construct the radio map DB, the optimal communication providing apparatus 100 may collect and store information on the AP 200 in units of locations of one or more grids constituting the specific area. The information on the AP 200 collected here may include at least some of AP identification information, such as SSID and/or BSSID, reception sensitivity information for each location, channel information for each AP, and bandwidth information.

Since a conventional radio map is constructed for the purpose of positioning, information on the center frequency and bandwidth of each AP is not collected. In contrast, the optimal communication providing apparatus 100 may collect channel information and bandwidth information provided for each AP in units of grid locations, thereby utilizing the radio map not only for optimal communication, but also for location estimation, which is a well-known application of the radio map.

In the case of Wi-Fi, a center frequency may be calculated based on channel information, and up to which center frequency interference extends may be determined based on the bandwidth information. Accordingly, the radio map DB unit 110 may estimate the user's location by constructing a radio map including channel information and bandwidth information for each AP for calculating an interference component for each channel, and provide optimal communication dynamically determined for an estimated location to the user terminal 300.

The optimal communication providing apparatus 100 may estimate a location of the user terminal 300 based on the radio map (S120).

In detail, the optimal communication providing apparatus 100 may estimate the user's location by comparing the terminal reception sensitivity collected by the user terminal 300 with a radio map previously constructed in the radio map DB 110. The optimal communication providing apparatus 100 may compare the reception sensitivity collected by the user terminal 300 with the reception sensitivity information of a signal for a location of each AP stored in units of grid locations in the radio map DB, and estimate a grid location corresponding to the reception sensitivity information for each location having the highest similarity as the current location of the user terminal 300.

The optimal communication providing apparatus 100 may determine at least one of an optimal AP and an optimal channel for the estimated location of the user terminal 300, based on the interference component for each channel (S130).

Here, the optimal AP may refer to an AP capable of securing optimal communication quality at the estimated current location of the user terminal 300, among APs to which the user terminal 300 may access, and may specifically be an AP that provides a channel capable of securing an optimal SINR.

Here, the accessible AP may refer to an AP that the user terminal 300 may access when necessary to use the Internet service, such as an AP that the user knows a password or the user terminal 300 has a history of access, a public AP, and the like.

The optimal communication providing apparatus 100 may determine at least one of the AP and channel capable of providing optimal communication at the estimated current location of the user terminal 300, based on the reception sensitivity information for a location of each AP included in the radio map.

Specifically, the optimal communication providing apparatus 100 may determine an AP having the highest reception sensitivity at the location of the user terminal 300 among accessible APs, as an optimal AP. And, for the remaining APs excluding the optimal AP, among the channels of the optimal AP, the optimal communication determining unit 130 may add up reception sensitivity at the current location of the user terminal 300 for each channel using the radio map DB unit 110 to calculate an interference component for each channel.

Here, a reception sensitivity level for each AP is generally collected in a dBm unit corresponding to a logarithmic scale. The optimal communication providing apparatus 100 may convert the reception sensitivity level for each AP into an mW unit corresponding to a linear scale, add up the converted reception sensitivity level of each AP by channels to calculate an interference component for each channel, and then convert the interference component into the dBm unit.

Based on the interference component calculated in this manner, the optimal communication providing apparatus 100 may determine a channel having the smallest interference component, that is, a channel capable of securing the largest SINR value as an optimal channel.

Figure 4:
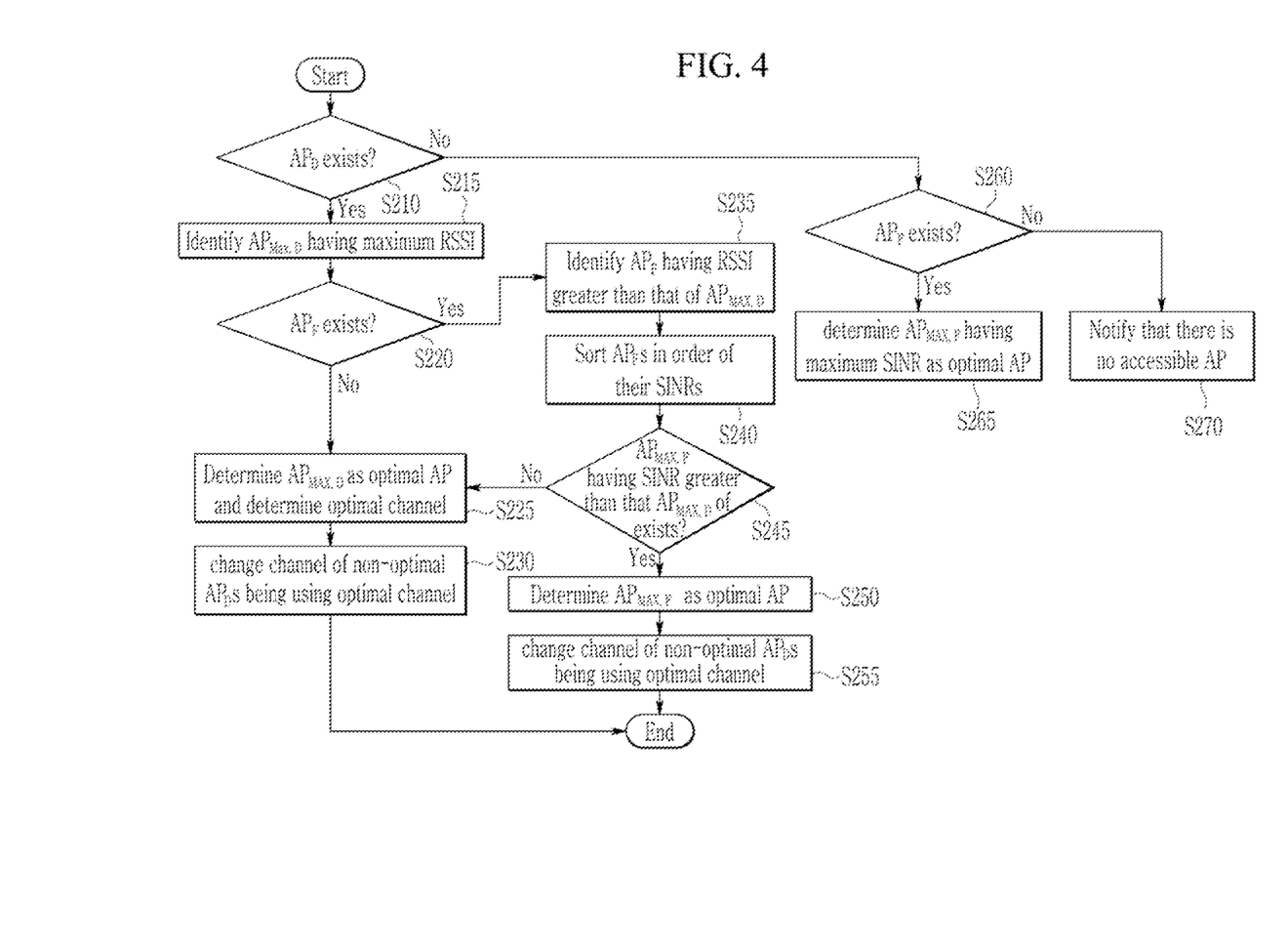
FIG. 4 is a flowchart illustrating an optimal communication providing method according to the present disclosure in an exemplary embodiment in which a plurality of APs exist.

FIG. 4 is a flowchart illustrating an optimal communication providing method according to the present disclosure in an exemplary embodiment in which a plurality of APs exist.

First, an example in which, among the plurality of APs, an AP having the largest reception sensitivity value at the current location of the user terminal 300 is $AP_D$ capable of changing channels may be described.

Referring to FIG. 2, the optimal communication providing apparatus 100 may determine whether $AP_D$ capable of changing channels, among a plurality of APs, exists (S210). If the $AP_D$ exists, the optimal communication providing apparatus 100 may identify $AP_{MAX,D}$ having the maximum reception sensitivity value (RSSI) at the current location of the user terminal 300 (S215).

The optimal communication providing apparatus 100 may determine whether $AP_F$ incapable of changing channels exists, among the plurality of APs (S220). If the $AP_F$ does not exist, the optimal communication providing apparatus 100 may determine $AP_{MAX,D}$ as an optimal AP, and may determine a channel having the largest SINR value among channels provided by $AP_{MAX,D}$ as an optimal channel (S225).

In the case of determining the channel having the largest SINR value among the channels provided by $AP_{MAX,D}$, the interference component caused by the $AP_D$ capable of changing channels may be controlled by changing channels, but the interference component caused by the $AP_F$ incapable of changing channels cannot be controlled. Therefore, the maximum SINR value may be calculated by excluding the interference component caused by the $AP_D$ and including the interference component caused by the $AP_F$, among the remaining APs except for $AP_{MAX,D}$.

In addition, when at least some of the non-optimal $AP_{DS}$ use the optimal channel, the optimal communication providing apparatus 100 may change the channel of the corresponding $AP_D$ to arbitrary channels other than the optimal channel (S230), thereby further improving communication quality provided to the user terminal 300 by the optimal channel of the optimal AP.

Next, an example in which an AP having the largest reception sensitivity value at the current location of the user terminal 300, among a plurality of APs, is an $AP_F$ incapable of changing channels may be described.

The optimal communication providing apparatus 100 may identify $AP_{MAX,D}$ having the maximum reception sensitivity value at the current location of the user terminal 300 (S215), and then determine whether $AP_F$ incapable of changing channels exists in the plurality of APs (S220). When the $AP_F$ exists, the optimal communication providing apparatus 100 may identify an $AP_F$ having a reception sensitivity value greater than that of $AP_{MAX,D}$ (S235).

When two or more $AP_{FS}$ having a reception sensitivity value greater than $AP_{MAX,D}$ are identified, the optimal communication providing apparatus 100 may sort the identified $AP_{FS}$ in order of their the SINR values (S240). The optimal communication providing apparatus 100 may determine whether $AP_{MAX,F}$ having a SINR value greater than that of $AP_{MAX,D}$ exists by comparing the SINR values of the identified $AP_{FS}$ with the SINR value of the $AP_{MAX,D}$ (S245). If $AP_{MAX,F}$ exists, the optimal communication providing apparatus 100 may determine $AP_{MAX,F}$ as an optimal AP (S250).

When calculating the maximum SINR value that may be secured by $AP_F$, the interference component caused by the $AP_D$ capable of changing channels may be controlled by changing channels but the interference component caused by the $AP_F$ incapable of changing channels cannot be controlled, so the maximum SINR value may be calculated by excluding the interference component caused by the $AP_D$ and including the interference component caused by the $AP_F$ among the remaining APs except for the $AP_F$ whose SINR value is to be calculated.

In addition, when at least some of the non-optimal $AP_{DS}$ use the optimal channel, the optimal communication providing apparatus 100 may change channel of the corresponding $AP_D$ to arbitrary channels other than the optimal channel (S255), thereby further improving communication quality provided to the user terminal 300 by the optimal channel of the optimal AP.

Meanwhile, when $AP_{MAX,F}$ does not exist, the optimal communication providing apparatus 100 may determine $AP_{MAX,D}$ as an optimal AP instead of the $AP_F$ having a reception sensitivity value greater than that of $AP_{MAX,D}$ (S225).

Next, an example in which an $AP_D$ capable of changing channels does not exist among a plurality of APs may be described. The optimal communication providing apparatus 100 may determine whether an $AP_F$ incapable of changing channels exists among a plurality of APs (S260). If the $AP_F$ does exist, the optimal communication providing apparatus 100 may determine $AP_F$ capable of securing the maximum SINR value, among $AP_{FS}$ incapable of changing channels, as an optimal AP (S265).

Meanwhile, when it is determined that neither an $AP_D$ capable of changing channels nor an $AP_F$ incapable of changing channels exist among a plurality of APs (S260), the optimal communication providing apparatus 100 notifies the user terminal 300 that there is no accessible AP (S270).

Figure 5:
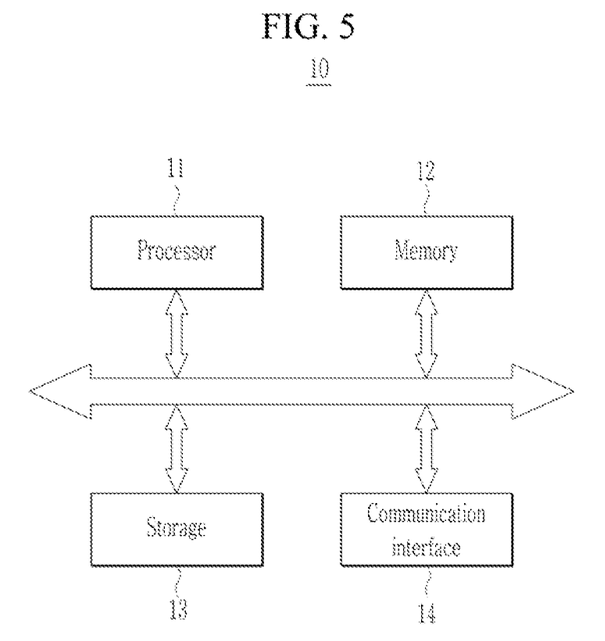
FIG. 5 is a block diagram illustrating a computing device for providing an optimal communication providing method according to some exemplary embodiments of the present disclosure.

FIG. 5 is a block diagram illustrating a computing device for providing an optimal communication providing method according to some exemplary embodiments of the present disclosure.

Here, a computing device 10 providing an optimal communication providing method may be the optimal communication providing apparatus 100 described above or may be one or more APs and/or one or more user terminals 300 communicatively connected to the optimal communication providing apparatus 100) to provide optimal communication. However, the present disclosure is not limited thereto.

Referring to FIG. 5, the computing device 10 according to the present disclosure may include one or more processors 11, a memory 12 loading a program executed by the processors 11, a storage 13 storing a program and various data, and a communication interface 14. However, the components described above are not essential to implement the computing device 10 according to the present disclosure, and the computing device 10 may have more or fewer components than the components listed above. For example, the computing device 10 may further include an output unit and/or an input unit (not shown), or the storage 13 may be omitted.

The program may include instructions that, when loaded into memory 12, cause the processor 11 to perform methods/operations according to various exemplary embodiments of the present disclosure. That is, the processor 11 may perform methods/operations according to various exemplary embodiments of the present disclosure by executing the instructions. The program includes a series of computer-readable instructions grouped together on a functional basis and is executed by a processor.

The processor 11 controls the overall operation of each component of the computing device 10. The processor 11 may include at least one of a central processing unit (CPU), a micro processor unit (MPU), a micro controller unit (MCU), a graphic processing unit (GPU), or any type of processors well known in the art of the present disclosure. Also, the processor 11 may perform an operation for at least one application or program for executing a method/operation according to various exemplary embodiments of the present disclosure.

The memory 12 stores various data, commands and/or information. The memory 12 may load one or more programs from the storage 13 to execute methods/operations according to various exemplary embodiments of the present disclosure. The memory 12 may be implemented as a volatile memory, such as RAM, but the technical scope of the present disclosure is not limited thereto.

The storage 13 may store programs non-temporarily. The storage 13 may include a non-volatile memory, such as read only memory (ROM), erasable programmable ROM (EPROM), electrically erasable programmable ROM (EEPROM), flash memory, or the like, a hard disk, a removable disk, or any type of computer-readable recording medium well known in the art. The communication interface 14 may be a wired/wireless communication module.

The exemplary embodiments of the present disclosure may not necessarily be implemented only through the foregoing devices and methods but may also be implemented through a program for realizing functions corresponding to the configurations of the exemplary embodiments of the present disclosure, a recording medium including the program, or the like.

The exemplary embodiments of the present disclosure have been described in detail, but the scope of the present disclosure is not limited thereto and various variants and modifications by a person skilled in the art using a basic concept of the present disclosure defined in claims also belong to the scope of the present disclosure.

What is claimed is:

1. A method for providing optimal communication performed by a computing system, the method comprising:
   constructing a radio map including information for calculating an interference component for each channel, for one or more access points (APs);
   estimating a location of a user terminal, based on the radio map; and
   determining at least one of an optimal AP and an optimal channel for the estimated location of the user terminal, based on the interference component for each channel, wherein:
   the radio map further includes at least some of AP identification information of each of the one or more APs and reception sensitivity information for a location of each of the one or more APs, and
   the estimating the location of the user terminal includes:
      comparing terminal reception sensitivity collected from the user terminal with the reception sensitivity information of the radio map for each location; and
      estimating, as a location of the user terminal, a location corresponding to the reception sensitivity information for each location having a highest similarity with the terminal reception sensitivity.

2. The method of claim 1, wherein the information for calculating the interference component for each channel includes at least some of channel information and bandwidth information provided by each of the one or more APs.

3. The method of claim 1, wherein the determining at least one of the optimal AP and optimal channel includes:
   determining, as the optimal AP, an AP having a highest reception sensitivity at the location of the user terminal, among the one or more APs; and
   determining as the optimal channel, a channel having a highest SINR value calculated based on the interference component for each channel of remaining APs, except for the optimal AP, among channels of the optimal AP.

4. The method of claim 1, wherein the determining at least one of the optimal AP and optimal channel includes:
   classifying the one or more APs, based on whether the one or more APs are capable of changing channels;
   identifying APMAX,D having a highest reception sensitivity at the location of the user terminal, among APDs capable of changing channels;

determining whether APMAX,F having a greater reception sensitivity, compared to the APMAX,D, among the APF incapable of changing channels;
when the APMAX,F does not exist, determining the APMAX,D as the optimal AP; and
determining, as the optimal channel, a channel having a highest SINR value calculated based on the interference component for each channel of remaining APs, except for the optimal AP, among the channels of the optimal AP.

5. The method of claim 4, wherein the determining at least one of the optimal AP and the optimal channel includes:
when the APMAX,F exists, calculating a SINRF value of a channel of the APMAX,F, based on the interference component for each channel of the remaining APs, except for the APMAX,F,
identifying a highest SINRD value, among the SINR values of respective channels provided by the APMAX, D, based on the interference component for each channel of the remaining APs, except for the APMAX,D; and
when the SINRF value is higher than the SINRD value, determining APMAX,F as the optimal AP and determining a channel of the APMAX,F as the optimal channel.

6. The method of claim 5, wherein the determining at least one of the optimal AP and optimal channel further includes:
when the SINRD value is higher than the SINRF value, determining the APMAX,D as the optimal AP; and
determining a channel corresponding to the SINRD value, among the channels of the APMAX,D, as the optimal channel.

7. The method of claim 1, wherein the determining the optimal channel includes:
calculating a SINR value for each channel of the optimal AP by considering only the interference component for each channel of an APF incapable of changing channels, among remaining APs except for the optimal AP; and
determining, as the optimal channel, a channel for which a highest SINR value is calculated.

8. The method of claim 1, further comprising
when at least one non-optimal AP uses the optimal channel, changing the channel of the at least one non-optimal AP to a different channel than the optimal channel.

9. A method for providing optimal communication performed by a computing system, the method comprising:
constructing a radio map including information for calculating an interference component for each channel, for a plurality of access points (APs);
identifying an APMAX having a highest reception sensitivity at a current location of a user terminal, among the plurality of APs, based on the radio map; and
determining at least one of an optimal AP and an optimal channel for the current location of the user terminal, based on an attribute of the APMAX and an interference component for each channel of at least some of the plurality of APs,
wherein:
the radio map further includes at least some of AP identification information of each of the one or more APs and reception sensitivity information for a location of each of the one or more APs, and
the current location of the user terminal is a location corresponding to reception sensitivity information for each location having a highest similarity with a terminal reception sensitivity collected by the user terminal, by comparing the terminal reception sensitivity with reception sensitivity information for each location of the radio map.

10. The method of claim 9, wherein the information for calculating the interference component for each channel includes at least some of channel information and bandwidth information provided by each of the plurality of APs.

11. The method of claim 9, wherein the determining at least one of the optimal AP and optimal channel includes:
determining the APMAX as the optimal AP; and
determining as the optimal channel, a channel having a highest SINR value calculated based on the interference component for each channel of remaining APs, except for the optimal AP, among channels of the optimal AP.

12. The method of claim 9, wherein the attribute of the AP includes an indication of the AP's capability to change channels.

13. The method of claim 12, wherein the determining at least one of the optimal AP and optimal channel includes:
classifying the plurality of APs, based on whether the one or more APs are capable of changing channels;
when the APMAX is an APD capable of changing channels, determining the APMAX as the optimal AP; and
determining, as the optimal channel, a channel having a highest SINR value calculated based on the interference component for each channel of remaining APs, except for the optimal AP, among the channels of the optimal AP.

14. The method of claim 13, wherein the determining at least one of the optimal AP and the optimal channel includes:
when the APMAX is an APF incapable of changing channels, calculating a SINR value of a channel of the APMAX, based on the interference component for each channel of the remaining APs, except for the APMAX;
identifying a highest SINRD value, among the SINR values of respective channels of APMAX,D, among the APDs capable of changing channels; and
when the SINRF value is higher than the SINRD value, determining the APMAX as the optimal AP and determining a channel provided by the APMAX as the optimal channel.

15. The method of claim 14, wherein the determining at least one of the optimal AP and optimal channel further includes:
when the SINRD value is higher than the SINRF value, determining the APMAX,D as the optimal AP; and
determining a channel corresponding to the SINRD value, among the channels of the APMAX,D, as the optimal channel.

16. The method of claim 9, wherein the determining of the optimal channel includes:
calculating a SINR value for each channel of the optimal AP by considering only the interference component for each channel of an APF incapable of changing channels, among remaining APs except for the optimal AP; and
determining, as the optimal channel, a channel for which a highest SINR value is calculated.

17. The method of claim 9, further comprising:
when at least one non-optimal AP uses being using the optimal channel, changing the channel of the at least one non-optimal AP to a different channel than the optimal channel.

18. A computing apparatus comprising:
a memory comprising instructions; and
a processor executing the instructions to:
- construct a radio map including information for calculating an interference component for each channel, for one or more access points (APs);
- estimate a location of a user terminal, based on the radio map; and
- determine at least one of an optimal AP and an optimal channel for the estimated location of the user terminal, based on the interference component for each channel, wherein:
the radio map further includes at least some of AP identification information of each of the one or more APs and reception sensitivity information for a location of each of the one or more APs, and
in order to estimate the location of the user terminal, the processor executing the instruction to compare terminal reception sensitivity collected from the user terminal with the reception sensitivity information of the radio map for each location; and estimate, as a location of the user terminal, a location corresponding to the reception sensitivity information for each location having a highest similarity with the terminal reception sensitivity.

* * * * *